May 28, 1963     L. HELLER ETAL     3,091,250
DEVICE FOR PREVENTING THE FREEZING-IN OF AIR VENT VALVES
Filed Jan. 27, 1961
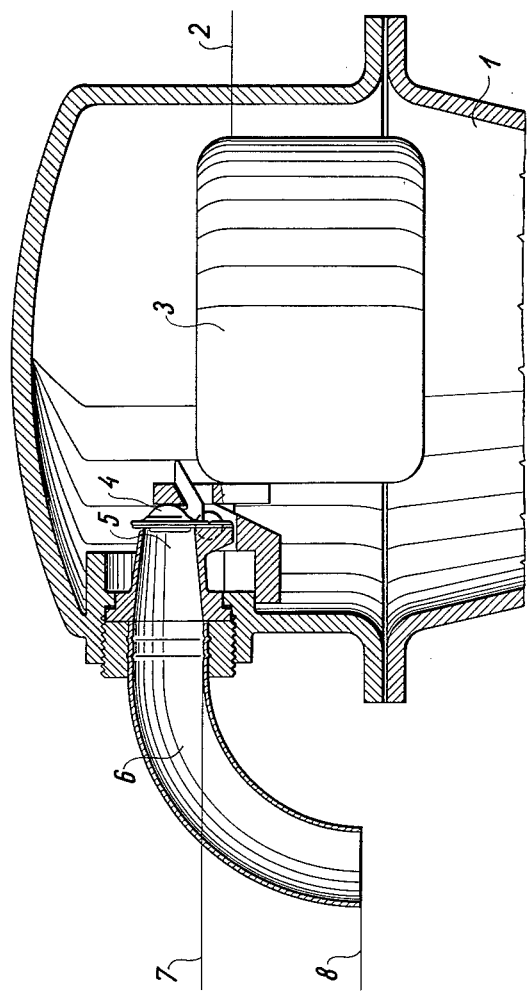
INVENTORS
LÁSZLÓ HELLER, LASZLO FORGO, &
MIHALY HORVÁTH
BY Blum, Moscovitz,
Friedman & Blum
ATTORNEYS

United States Patent Office 3,091,250
Patented May 28, 1963

3,091,250
DEVICE FOR PREVENTING THE FREEZING-IN OF AIR VENT VALVES
László Heller, László Forgo, and Mihaly Horváth, all of Budapest, Hungary, assignors to Licencia Talalmanyokat Ertekesito Vallalat, Budapest, Hungary
Filed Jan. 27, 1961, Ser. No. 85,341
4 Claims. (Cl. 137—202)

This invention relates to means for preventing the freezing-in of air vent valves.

As is known, with air condensation systems of power plants the dead steam withdrawing from the steam turbines of the plant is condensed in a mixing condenser and the cooling water warmed up in the condenser is recooled by means of heat exchangers erected in the open air. Dependent on weather conditions and, as a rule, in winter time, it is necessary to insert or disconnect some parts of the heat exchangers which are subdivided for this purpose. Upon disconnection, the water in the heat exchangers has to be drained off for which purpose air has to be admitted since, otherwise, the water cannot withdraw therefrom. Furthermore, upon reinsertion of a previously disconnected part of the heat exchanger in the course of filling-up the water has to push the air in front thereof as it rises in the heat exchangers. For carrying out such operations, air vent valves are provided on the top of the heat exchangers, such valves having a float which, upon sinking of the water level, opens a valve whereas, upon a suitable rising of the water level, causes the valve to be closed.

An unobjectionable work of the air vent valves is of high importance as regards the reliability of operation of air condensation systems, particularly in rough weather when draining of the heat exchangers has to take place very quickly. Should the air vent valve not work suitably, that is, should it not quickly enough admit the desired amount of air required for a quick draining off of the water, a freezing-in of the expensive heat exchanger may occur and destroy it, the operation of the power plant being prevented until destroyed heat exchanger portions are repaired or substituted by new ones.

Unserviceability of air vent valves in rough weather, especially in winter time is, as a rule, caused by freezing-in. Namely, the water present between the valve plate and its seat freezes upon contact with the open or atmospheric air and the weight of the float is insufficient to cause a separation of the valve plate and its seat thus frozen together. In order to prevent such inconveniences, various expedients are applied for warranting a suitable frost resistance of air vent valves used in air condensation systems. One of such expedients consists in accommodating the entire air vent valve within the heat exchanger proper so that it be in constant contact with the water circulated in the heat exchanger and, thus, less liable to freezing-in. Furthermore, by means of suitably sized rippings and pads having excellent heat conducting properties a possibly close mechanic contact is obtained between the valve, its seat and the metallic portion of the heat exchanger swept by hot water. However, none of the aforesaid expedients has proved to be sufficiently reliable.

The main object of the present invention is to provide a new means for preventing the freezing-in of air vent valves in a manner basically different from that hitherto known. According to the basic idea of the invention, an elbow pipe of about 90° and having a diameter equal to that of the air passage of the air vent valve is provided in front of said passage, one extremity of the elbow pipe being connected airtightly to said air passage whereas its other end is turned downwards and opens into the ambient atmosphere (open air).

The elbow pipe according to the invention serves for preventing the air warmed up by the metallic portions of the air vent valve from flowing upwards whereby it is warranted that the air once warmed up always remains in contact with the air vent valve. Viz., the air in the elbow pipe is always warmer and thus lighter than the air of the ambient atmosphere so that it is held by the relatively cooler air of the ambient atmosphere always within the elbow pipe.

Thus, the elbow pipe has to be formed and arranged so that even the topmost portion of its brim contacting the open air be at a level below the lowmost portion of the air passage of the valve. By such an arrangement, it is warranted that the whole cross-sectional area of the valve is always covered by a warm air cushion.

Moreover, the elbow pipe according to the invention obviously prevents also that the warm air be swept away by a wind which entails thereby a freezing-in of the air vent valve. Furthermore, the elbow pipe according to the invention prevents rain, wind, hoar-frost and the like from getting between the moving parts of the air vent valve and thus from enhancing its freezing-in.

Further details of the present invention will more fully be described by taking reference to the accompanying drawing which shows, by way of example, an exemplified embodiment of the device according to the invention. An air vent valve provided with a float is accommodated on the top portion of a heat exchanger 1. The arrangement is such that the water level rises about to three-quarters of the float 3 as indicated by a line 2. A valve 4 is operated by the float 3 so as to be pressed against a seat 5 of the former. This valve seat 5 has an air release elbow pipe 6 according to the invention connected to it. The lowmost portion of the air passage of the valve is on level 7. The brim of the elbow pipe contacts the open air at level 8.

The valve seat 5 may be further defined as a passage extending through the peripheral wall of casing 1. The inner end of the valve seat or passage 5 is adapted to be closed by the valve 4. The valve seat 5 is of generally frustro-conical shape and of increasing diameter in the outward direction. Accordingly, the passage is downwardly sloped from its inner end to its outer end.

By locating the whole valve structure well within the water chamber, it is remotely placed not only from the cold ambient atmosphere but also from the directly cooled walls of the liquid container. Because of this the valve seat is separated from the outer portions of the construction by very thin walls, which resist heat exchange between the valve seat and the casing wall through the tube wall seat towards the atmosphere. In particular, it is pointed out that the tube 5, which terminates at its inner end in the valve seat has walls which are considerably thinner than the main casing wall, and thereby have greater resistance to heat flow.

Without such elbow pipe 6 being applied, the air warmed up by the casing of the valve and the valve seat contacting with warmed water would, due to its relatively lesser specific weight, lift and yield its place to fresh cool air. Such cool air, in turn, would entail a freezing of the water escaping through the valve and penetrating between the valve and its seat. At a subsequent emptying of the heat exchanger such freezing-in entails a jamming of the air vent valve and thereby a freezing-in of the heat exchanger proper.

The inclined shape of the lower wall of the passage or valve seat 5 is important because any water forced out between valve 4 and seat 5 will then flow freely down by gravity into and out of elbow pipe 6. This prevents freezing of water on the outside of the valve, such as would freeze the valve to its seat and on the one hand prevent further venting, and on the other hand, prevent the valve from opening when water is to be withdrawn from the heat exchanger.

On the other hand, the elbow pipe 6 prevents the warmed-up air from upward escaping, a passage existing downwards only in which direction an escape is obviously impossible. At the same time, the prescribed operation of the air vent valve is obviously not hampered by the elbow pipe which permits admittance as well as withdrawal of air.

What we claim is:

1. In a heat exchanger of the type described and the like, the combination of:
   (a) a casing having a peripheral wall and a top;
   (b) said wall having a through radial passage near said top;
   (c) an outlet pipe extending frictionally into said passage and inclined continuously downwardly from its inner end to its outer end;
   (d) a round bored tube in said casing extending inwardly from said outlet pipe in endwise tight abutment therewith;
   (e) the lower portion of the bore of said tube being pocketless and inclined smoothly continuously downwardly from the inner end to the outer end of said tube and merging smoothly and pocketlessly with the bore of said outlet pipe;
   (f) the inner end of said tube being shaped to form a valve seat;
   (g) a float in said casing arranged for floating on water therein and moving vertically in accordance with the rise and fall of the water;
   (h) a valve operatively coupled to said float, and positioned and adapted relative to said valve seat to be seated upon said valve seat and thereby ordinarily block said tube bore upon use of said float and to be unseated from said valve seat upon fall of said float;
   (i) said pipe having the outer end extending downwardly to a level below the lowest level of said tube to ensure water runoff from said tube and to ensure trapping of warm air from casing in said tube and pipe when said valve is closed; and
   (j) said tube bore and the pipe bore being shaped to ensure a trickle runoff, without accumulation therein from said valve seat of water drops trapped when the valve is closed and of water forced between the closed valve and seat as the result of excess pressure in the casing.

2. Combination according to claim 1, said tube being sufficiently long to locate said valve seat remotely from the directly cooled casing wall and thereby tend to maintain said valve seat at internal casing temperature.

3. The combination according to claim 2, the tube wall being thin relative to the casing wall to resist heat exchange between said valve seat and said casing wall through said tube wall.

4. The combination according to claim 1, the tube wall being thin relative to the casing wall to resist heat exchange between said valve seat and said casing wall through said tube wall.

References Cited in the file of this patent

UNITED STATES PATENTS

| | | |
|---|---|---|
| 386,242 | Fry | July 17, 1888 |
| 2,263,142 | Pratt | Nov. 18, 1941 |
| 2,284,354 | Acly | May 26, 1942 |
| 2,570,557 | Johnson | Oct. 9, 1951 |
| 2,944,561 | Sellati | July 12, 1960 |

FOREIGN PATENTS

| | | |
|---|---|---|
| 509,059 | Great Britain | July 11, 1939 |